Feb. 6, 1951        C. A. THOMAS        2,540,845
PERMANENT MAGNET DYNAMOELECTRIC MACHINE
WITH AUTOMATIC KEEPER
Filed Oct. 7, 1949

Inventor:
Charles A. Thomas,
by Ernest T. Britton
His Attorney.

Patented Feb. 6, 1951

2,540,845

UNITED STATES PATENT OFFICE 2,540,845

PERMANENT MAGNET DYNAMOELECTRIC MACHINE WITH AUTOMATIC KEEPER

Charles A. Thomas, Fort Wayne, Ind., assignor to General Electric Company, a corporation of New York Application October 7, 1949, Serial No. 120,092

4 Claims. (Cl. 171—209)

My invention relates to dynamoelectric machines with permanent magnet stators and, more particularly, to automatic keepers to retain the maximum value of magnetism of the stators thereof.

It is particularly important to maintain maximum flux intensity in the permanent magnet stators of small dynamoelectric machines. The stator of such a machine is permanently magnetized on the major hysteresis loop of the magnetic material of the stator to provide the maximum flux density for a given size of magnet and retains maximum flux density while an external magnetic circuit of low reluctance, such as the rotor of the motor, is maintained between the poles of the stator. When the rotor is removed leaving only the air gap between the poles however, the magnetism of the poles drops to a lower point on the demagnetization curve of the major hysteresis loop of the material forming the stator resulting in a lower flux density in the stator. There is some increase in the stator flux density when the rotor is replaced within the stator, but this increase occurs along a minor hysteresis loop resulting in a less than maximum flux density in the poles. To retain the maximum flux density required, even though the rotor is removed, a low reluctance circuit is provided and arranged so as automatically to be positioned between the stator poles when the rotor is withdrawn from within the stator.

An object of my invention is to provide an automatic keeper for the stator of a dynamoelectric machine.

Another object of my invention is to provide an improved stator for a dynamoelectric machine wherein the magnetic flux density of the stator is continually held at a high level whether or not the rotor is in position within the stator.

Another object of my invention is to provide an improved automatic keeper for a dynamoelectric machine wherein an external low reluctance circuit is automatically introduced between the poles of the stator to maintain the magnetic flux density of the poles at a high level when the rotor is removed from or replaced in a stator.

In accordance with my invention there is provided in a dynamoelectric machine having a permanent magnet stator and soft iron pole shoes a keeper of soft iron biased to a position adjacent the soft iron pole shoes to provide a continuous magnetic circuit between the poles when the rotor is removed in order to maintain in the poles the high value of magnetism originally induced therein.

Figure 1:
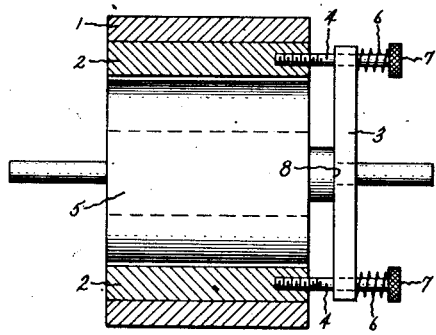
Figure 2:
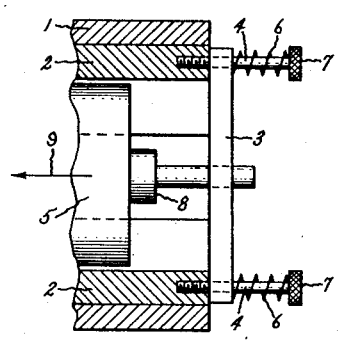
Figure 3:
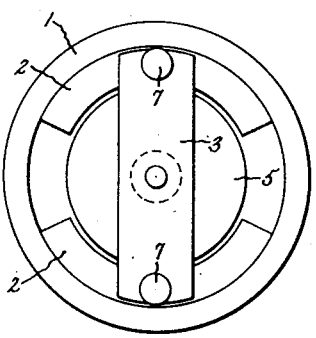
Figure 4:
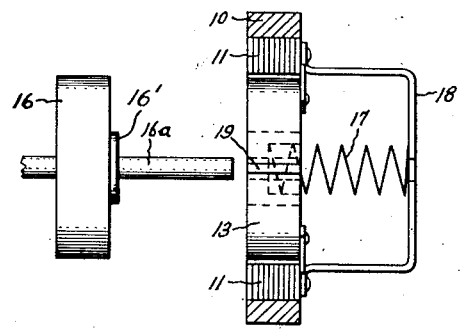

For a better understanding of my invention, reference is made to the accompanying drawing in which Fig. 1 is a diagrammatic view of the keeper biased by springs towards the soft iron shoes forming the poles of the stator when the rotor is in place within the stator; Fig. 2 shows the rotor being withdrawn from the stator and the springs biasing the keeper against the pole shoes; Fig. 3 is an end view of the motor and keeper shown in Figs. 1 and 2; Fig. 4 is a view partly in section of a modification of my invention for use with laminated pole pieces and Fig. 5 is an end view of the motor and keeper shown in Fig. 4.

Referring to the drawing, the stator comprises circular permanent magnet yoke 1 polarized to form polar areas therein and provided with soft iron pole shoes 2. A soft iron bar keeper 3 guided by a pair of non-magnetic pins 4 mounted upon the shoes 2 and extending in the axial direction of the rotor 5 is biased against the pole shoes 2 by springs 6 seated against the heads 7 of pins 4. When the rotor is in position within the stator the shoulder 8 of the rotor shaft forces the keeper 3 against the springs 4 so that the keeper is kept out of contact with the poles 2. Fig. 2 illustrates that as the rotor 5 is removed from the stator in the direction of the arrow 9, springs 4 automatically press keeper 3 against the pole shoes 2 providing a low reluctance external magnetic circuit between the poles.

Figure 5:
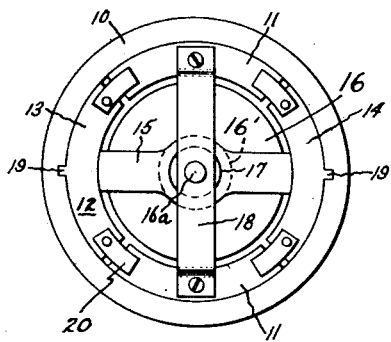

In the embodiment of the invention illustrated in Figs. 4 and 5, the stator is provided with a circular permanent magnet yoke member 10 and laminated pole pieces 11. A keeper 12 of magnetic material comprises two segmental pieces 13 and 14 which together with the pole pieces 11 complete a ring and are connected by a bar 15 through which a shaft 16a of rotor 16 projects when rotor 16 is in position within stator 10. Shaft 16a is provided with a shoulder 16' to contact bar 15. A spring 17 biases bar 15 away from a U-shaped bracket 18 which is fastened to the poles. Keeper 12 is provided with tongues 19 which slide in grooves in magnet 10 in the axial direction of the rotor allowing spring 17 to force segments 13 and 14 into position between poles 11 when the rotor is withdrawn from the stator. Stops 20 mounted upon segments 13 and 14 engage pole pieces 11.

While I have shown a particular embodiment of my invention it will, of course, be understood that I do not wish to be limited thereto since different modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. A permanent magnet stator for a dynamoelectric machine having a rotor provided with a shaft, said shaft having a shoulder, said stator comprising a circular permanent magnet yoke member polarized to form polar areas therein, said yoke member being provided with soft iron pole pieces, a movable keeper formed of magnetic material, means mounting said keeper for movement toward and away from said pole pieces in the axial direction of said shaft, said shoulder engaging said keeper to force said keeper out of engagement with said pole pieces when said rotor is mounted within said stator and means responsive to removal of said rotor from said stator for biasing said keeper into engagement with said pole pieces to provide an external low reluctance circuit therebetween.

2. A permanent magnet stator for a dynamoelectric machine having a rotor provided with a shaft, said shaft having a shoulder, said stator comprising a circular permanent magnet yoke member polarized to form polar areas therein, said yoke member being provided with soft iron pole pieces, centering pins formed of non-magnetic material mounted upon corresponding ends of said shoes and extending therefrom axially of said rotor, said pins being provided with heads upon the ends thereof opposite said shoes, a keeper formed of magnetic material slidably mounted upon said pins, springs mounted around each of said centering pins between said keeper and said heads, said shoulder retaining said keeper against said springs and out of engagement with said shoes when said rotor is in place within said stator, and when said rotor is removed from said stator said springs biasing said keeper into position adjacent said poles to form a low reluctance magnetic circuit between said poles.

3. A permanent magnet stator for a dynamoelectric machine having a rotor provided with a shaft, said shaft having a shoulder, comprising a circular permanent magnet yoke member polarized to form polar areas therein, said yoke member being provided with soft iron ring segment pole pieces, a keeper formed of magnetic material and constructed of two ring segments connected by a bar, said segments and said poles forming a ring when said segments are in position within said yoke, said keeper being slidably mounted in said yoke member, a bracket mounted on said pole pieces, a spring between said bracket and said keeper, said shoulder restraining said keeper against said spring when said rotor is in place within said stator and said spring biasing the ring segments of said keeper into position between said poles when said rotor is removed from within said stator to provide a low reluctance magnetic circuit between said poles.

4. A dynamoelectric machine comprising a rotor provided with a shaft, said shaft having a shoulder, a stator including a cylindrical permanent magnet yoke member polarized to form polar areas therein, said yoke member being provided with soft iron arcuate pole pieces, a bracket mounted upon said pole pieces, a keeper including a pair of arcuate sections of magnetic material connected by a bar and mounted to slide in said yoke member in the axial direction of said shaft, a spring mounted between said keeper and said bracket, said shoulder maintaining said keeper against said spring when said rotor is mounted within said stator for motor operation to restrain said keeper out of juxtaposition with said poles, and when said rotor is removed from within said stator said spring automatically biasing said keeper to a position with said arcuate sections adjacent said poles to form a low reluctance magnetic circuit therebetween, and stops mounted upon said arcuate sections to engage said poles to retain said keeper in said position.

CHARLES A. THOMAS.

REFERENCES CITED

The following references are of record in the file of this patent:

UNITED STATES PATENTS

| Number | Name | Date |
|---|---|---|
| 1,140,155 | Heins | May 18, 1915 |
| 1,484,619 | Blake | Feb. 26, 1924 |
| 1,790,763 | Pence | Feb. 3, 1931 |
| 2,279,846 | Stapleton | Apr. 14, 1942 |